US012587501B1

(12) United States Patent
Schwartz et al.

(10) Patent No.: US 12,587,501 B1
(45) Date of Patent: Mar. 24, 2026

(54) PEAK EVENT CONTENT DELIVERY NETWORK TRAFFIC SIMULATION AND TESTING

(71) Applicant: Amazon Technologies, Inc., Seattle, WA (US)

(72) Inventors: Daniel Schwartz, New Milford, NJ (US); Tyler Lehman Moore, New York, NY (US); Steven Charles Mascola, East Islip, NY (US); Simba Maponga, West Windsor, NJ (US); Thomas Bradley Scholl, Seattle, WA (US); Erik Anders Karulf, Eden Prairie, MN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/757,291

(22) Filed: Jun. 27, 2024

(51) Int. Cl.
  *G06F 13/00* (2006.01)
  *H04L 61/4511* (2022.01)
  *H04L 61/59* (2022.01)
  *H04L 101/668* (2022.01)
(52) U.S. Cl.
  CPC .......... *H04L 61/4511* (2022.05); *H04L 61/59* (2022.05); *H04L 2101/668* (2022.05)

(58) Field of Classification Search
  CPC . H04L 61/4511; H04L 61/59; H04L 2101/668
  USPC ........................................................ 709/245
  See application file for complete search history.

(56) References Cited

U.S. PATENT DOCUMENTS

| | | | | |
|---|---|---|---|---|
| 8,028,090 | B2 * | 9/2011 | Richardson | ............. H04L 67/60 |
| | | | | 709/217 |
| 12,143,289 | B2 * | 11/2024 | Kolar | ...................... H04L 45/42 |
| 2010/0125673 | A1 * | 5/2010 | Richardson | ......... H04L 67/1001 |
| | | | | 709/239 |
| 2023/0318964 | A1 * | 10/2023 | Kolar | .................... H04L 45/123 |
| | | | | 709/238 |

FOREIGN PATENT DOCUMENTS

WO      WO-2010057192 A1 *   5/2010   ............ H04W 4/021

* cited by examiner

*Primary Examiner* — Kenneth R Coulter
(74) *Attorney, Agent, or Firm* — Knobbe, Martens, Olson & Bear, LLP

(57)                ABSTRACT

Systems and methods are provided for peak event testing. The systems and methods enable spoofing a network address (such as a subnet or an IP address) for DNS queries during testing, thereby causing the DNS resolver to return a point of presence (POP) that is location-optimized for the spoofed client. Spoofing the DNS query can diversify the CDN PoPs used during testing without requiring a CDN to make any changes.

20 Claims, 3 Drawing Sheets

PEAK EVENT CONTENT DELIVERY NETWORK TRAFFIC SIMULATION AND TESTING

BACKGROUND

A content delivery network (CDN) refers to a geographically distributed group of servers that work together to provide network content. In a CDN, devices may be organized into points of presence (PoPs). An organization can host their content, such as a network site, at the CDN, which can be accessed through a domain name. A "peak event" can refer to a period of time when the organization expects higher than normal amounts of network traffic requesting content from the CDN. For example, during such an event, there can be a peak load of over 500 million HTTP requests per minute and/or a total of over one trillion HTTP requests. In order to prepare for a peak event, the organization can run a simulation and cause actual network traffic to be requested from a CDN as if the peak event was taking place.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
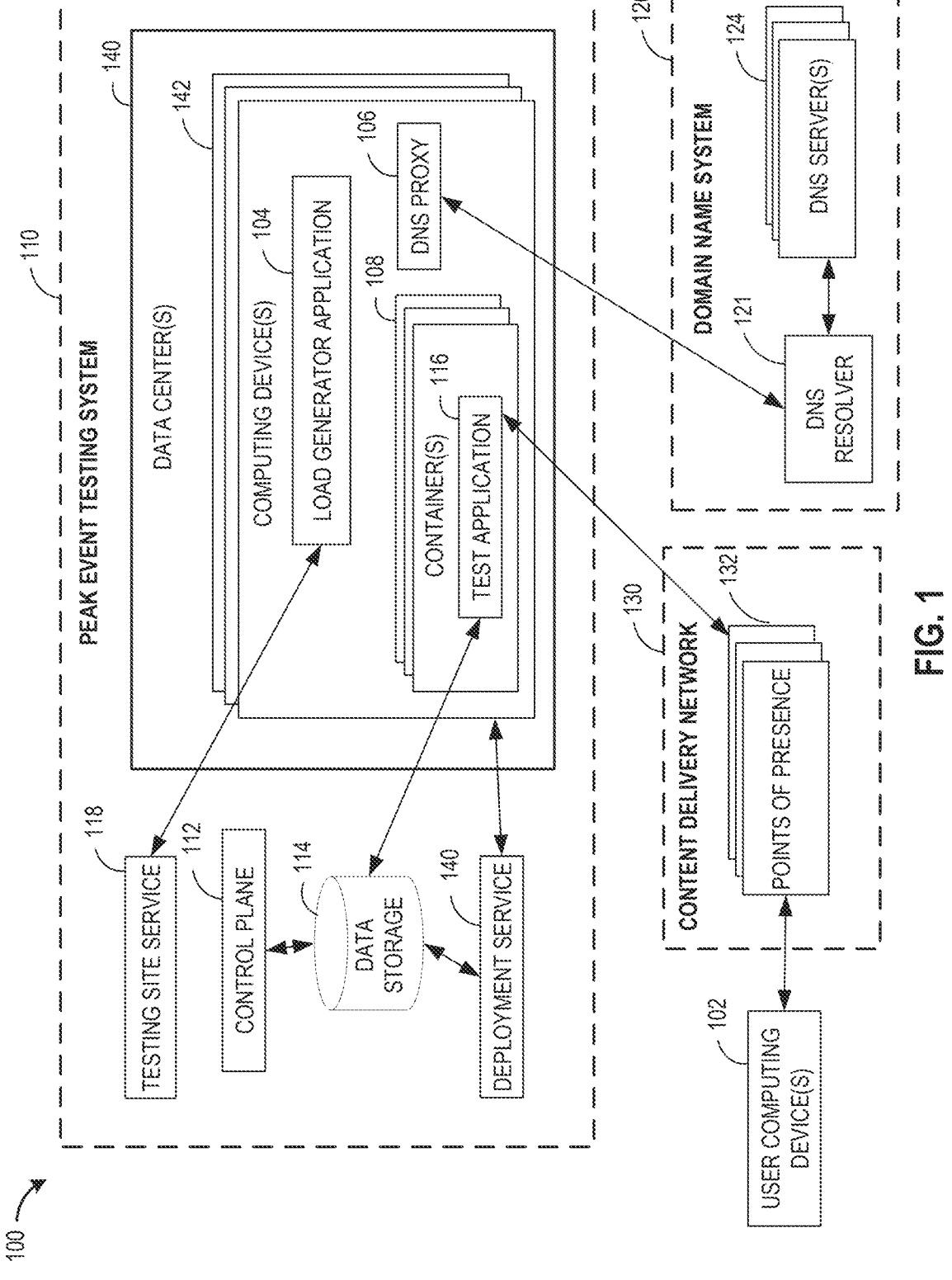
FIG. 1 is a schematic block diagram depicting an illustrative environment with a Domain Name System, a Content Delivery Network, and a peak event testing system.

As described above, an organization can perform peak event testing and run a simulation that creates actual network traffic for a CDN as if the peak event was taking place. In some cases, during a peak event, hundreds of different PoPs may receive requests (such as dozens of PoPs per country). Under a traditional peak event testing approach, network requests can be generated from the data centers of an organization. Since the organization has a limited number of data centers (such as ten), then a limited number of PoPs (such as ten) will, quite unrealistically, receive all of the test network traffic instead of the network traffic being spread out more. Accordingly, as described herein, causing a few number of PoPs to receive unrealistic amounts of traffic can have adverse effects, such as causing the CDN to throttle network traffic and/or increasing end-user network latency thereby negatively impacting end users.

Generally described, aspects of the present disclosure are directed to improved peak event network testing. A Domain Name System (DNS) query (also known as a DNS request) is a demand for information sent from a client computer to a DNS resolver. Generally, a DNS query is sent to request the Internet Protocol (IP) address associated with a domain name. In some cases, the DNS resolver is the computing device that responds to the DNS query from a client. The DNS resolver does this by making a series of requests until it reaches the authoritative DNS server for the requested record. The systems and methods described herein can spoof at least a portion of a source network address (such as a subnet or an IP address) for DNS queries during testing, thereby causing the DNS resolver to return a PoP that is location-optimized for the client's spoofed location. The testing system can spoof the DNS queries to be more similar to the DNS queries that are received during non-testing operation. Spoofing the DNS query can diversify the CDN PoPs used during testing without requiring a CDN to make any changes. Accordingly, the peak-event testing approaches described herein can result in more realistic and diverse set of CDN PoPs being used thereby improving computer network testing.

A subnet or IP subnet can refer to a logical subdivision of an IP network. Computers that belong to the same subnet can be addressed with an identical group of its most-significant bits of their IP addresses. This can result in the logical division of an IP address into two fields: the network number or routing prefix, and the rest field or host identifier. The rest field can be an identifier for a specific host or network interface. The routing prefix can be expressed as the first address of a network, written in Classless Inter-Domain Routing (CIDR) notation, followed by a slash character (/), and ending with the bit-length of the prefix. For example, 1.2.3.0/24 can be IP subnet or the prefix of the IP version 4 network starting at the given address, having 24 bits allocated for the network prefix, and the remaining 8 bits can be reserved for host addressing. As used herein, a "network address" can refer to at least a portion of a network address, such as an IP subnet, or an IP address.

Turning to FIG. 1, an illustrative environment 100 is shown. The components of the environment 100 can enable improved peak event testing where test requests can be dispersed among a sufficient number of PoPs unlike some existing testing systems. The environment 100 can include a peak event testing system 110, a DNS 120, a CDN 130, and user computing device(s) 102. The peak event testing system 110 can allow improved testing without necessarily requiring changes at the CDN 130. The peak event testing system 110 can include a control plane 112, a deployment service 140, a data storage 114, a testing site service 118, and one or more data centers 140. The DNS 120 can include a DNS resolver 121 and one or more DNS servers 124. The CDN 130 includes PoPs 132. As used herein, a "point of presence (POP)" can refer to collection of devices, such as servers, routers, and/or switches that collectively reflect a demarcation point between two or more networks. The constituents of the environment 100 may be in communication with each other either locally or over a network (not illustrated).

The control plane 112 can determine how much test traffic should be generated. The control plane 112 can access and/or write traffic testing parameters to and from the data storage 114. The traffic testing parameters can include profiles. A profile can indicate logical divisions (such as different regions or groups of computing devices) and an assignment of different amounts of traffic to the logical divisions. A deployment service 140 can access the traffic testing parameters from the data storage 114. The deployment service 140 can communicate with one or more data centers 140, which can provision computing devices 142 that can be used for peak event testing. As shown, a load generator application 104 can be deployed to each computing device 142. The deployment service 140 can, on each computing device 142, create one or more containers 108, which can be referred to as virtual containers. A "container" can refer to a unit of software that packages up code and its dependencies so that applications in the container can run reliably from one computing environment to another. Each container 108 can include a test application 116. In some embodiments, the test application 116 can be or include a headless browser application, which can be used to transmit content requests to the CDN 130. The test application 116 can write testing traffic metadata (such as statistics) to the data storage 114 during testing. Container virtualization can allow packaging and deployment of application(s) along with their dependencies in a consistent and isolated environment. In particular, each container 108 can be a stand-alone and executable package that includes everything needed to run a piece of software, including the code, runtime, system tools, libraries, and settings. The containers 108 can be based on containerization technology, which can allow applications and their dependencies to be isolated from the host system and other containers, ensuring consistency and portability across different environments.

The load generator application 104 can initiate a DNS proxy 106. The load generator application 104 can communicate with a testing site service 118, which can provide the source network address information (such as subnets) that are available for use by each load generator application 104. In some embodiments, the load generator application 104 can randomly or pseudo-randomly select the source network address information to be used by the DNS proxy 106. The load generator application 104 can configure and start the DNS proxy 106 during testing. During testing, the test application 116 can be programmed to transmit requests to the CDN 130. As described herein, the DNS proxy 106 can intercept requests from the container 108 and spoof DNS queries using the source network address information (such as spoofing DNS queries to use a selected subnet).

The DNS server 124 can receive a DNS query via the DNS resolver 121. The DNS server 124 can store and/or access DNS records. The DNS server 124 can use the client's network address information (such as the spoofed subnet) to make a routing decision and identify a point of presence (POP) 132 from the CDN 130. The DNS server 124 can respond to the DNS query with an IP address of the identified PoP 132. The computing device 142 can request content from the IP address of the identified PoP 132. Under prior testing circumstances, multiple DNS queries executed during testing and originating from the same data center 140 and different computing devices 142 would typically be routed to the same PoP and cause the issue(s) described herein. For example, the user computing devices 102 requesting content from the CDN 130 and particular PoPs 132 could be adversely affected. However, in the environment 100, even though multiple DNS queries originating from the same data center 140, the approach described herein can allow different computing devices 142 at the same data center 140 and performing tests to be routed to different PoPs, thereby improving the simulation and computer network testing. Accordingly, peak event testing can be performed while the user computing devices 102 are requesting content from the CDN 130 and particular PoPs 132 and may not be adversely affected.

The data storage 114 may be embodied in hard disk drives, solid state memories, any other type of non-transitory computer-readable storage medium. The data storage 114 may also be distributed or partitioned across multiple local and/or remote storage devices. The data storage 114 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TEXT (TXT) files, flat files, spreadsheet files, and/or any other widely used or proprietary format for data storage.

The communications between components of the environment 100 can occur over one or more networks. The network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks, such as HTTP and TCP/IP.

The peak event testing system 110, including the data center(s) 140, may be embodied in a plurality of devices. For example, the computing devices 142 of the data center(s) 140 may include a network interface, memory, hardware processor, and non-transitory computer-readable medium drive, all of which may communicate with each other by way of a communication bus. The network interface may provide connectivity over networks or computer systems. The hardware processor may communicate to and from memory containing program instructions that the hardware processor executes in order to operate the computing devices 102 and other components of the peak event testing system 110. The memory generally includes RAM, ROM, and/or other persistent and/or auxiliary non-transitory computer-readable storage media.

Additionally, in some embodiments, the peak event testing system 110 or components thereof (such as the containers 108) are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

The systems and methods described herein may improve computer networking technology. As described herein, existing testing approaches included causing peak event network traffic from data centers that were routed to a limited number of PoPs leading to adverse effects, such as causing the CDN to throttle network traffic, increasing end-user network latency, and/or leading to the CDN using slower hardware to accommodate the excessive amounts of traffic towards a few number of PoPs. The solutions described herein for spoofing at least a portion of a source network address (such as a subnet) for DNS queries can advantageously improve CDN traffic during peak event testing. For example, as described herein, a DNS server can advantageously provide an IP address for a POP based at least in part on the spoofed network address (such as a subnet) for a computing device in a data center. Even though the computing devices may transmit test requests from the same data center, the computing devices can be configured to spoof their network information to be directed to a wider variety of PoPs. Accordingly, the solutions described herein can prevent CDNs from having to throttle network traffic, decrease end-user network latency, and/or prevent CDNs from having to use slower hardware. Thus, the systems and methods described herein can improve over computer network testing technology and improve computer network performance.

Moreover, the solutions described herein may be inextricably tied to computer networking technology. For example, as described herein, spoofing DNS requests with a source network address (such as a client subnet) is inextricably tied to computer networking technology. The techniques described herein can advantageously use this type of spoofing technique to improve peak event testing. Thus, the systems and methods described herein are inextricably tied to computer networking technology.

Figure 2:
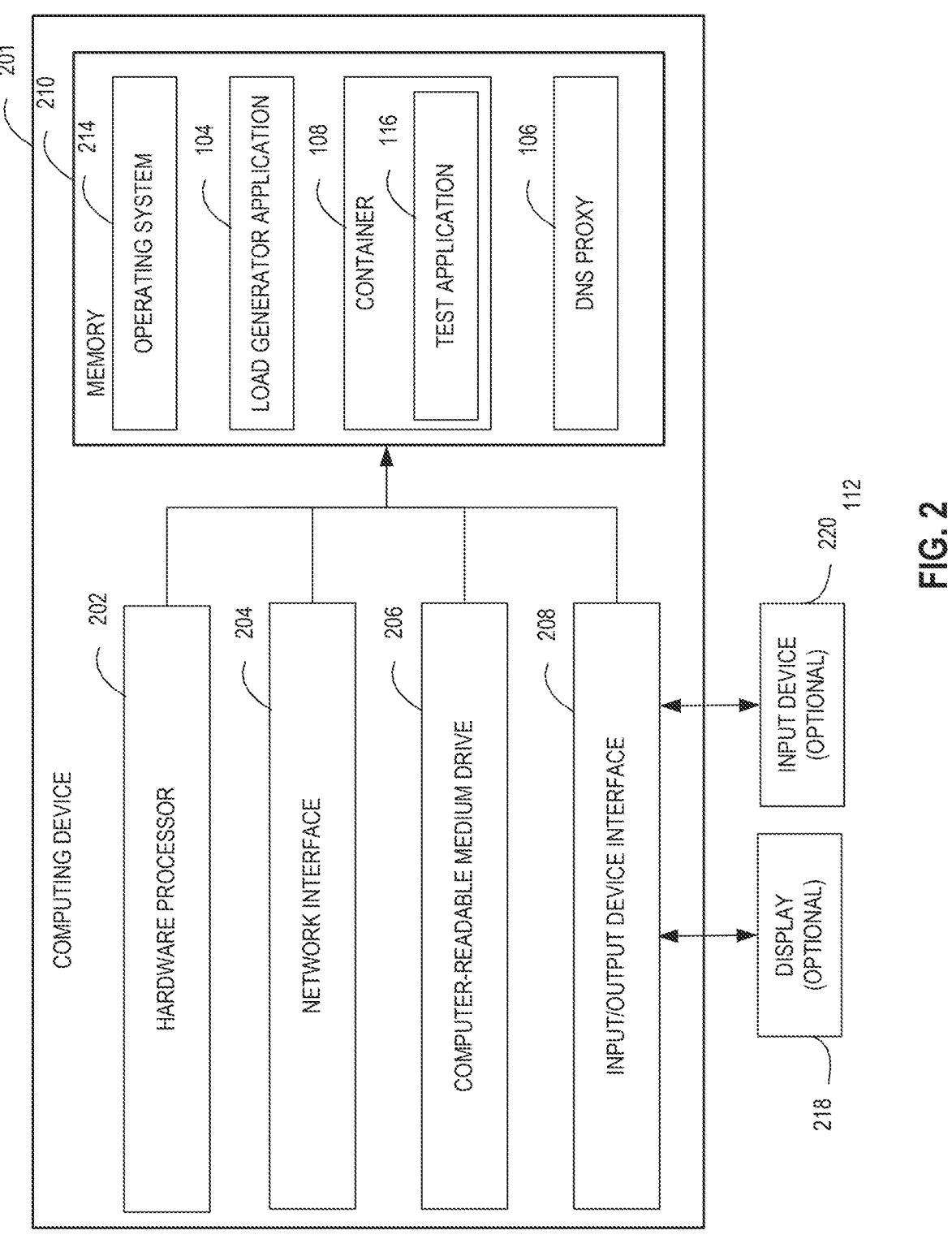
FIG. 2 is a schematic block diagram depicting an illustrative general architecture of a computing device for implementing aspects of the peak event testing system referenced in the network environment depicted in FIG. 1.

FIG. 2 is a schematic diagram of an illustrative general architecture of a computing device 201 for implementing the peak event testing system 110 referenced in the environment 100 in FIG. 1. In particular, the computing device 201 can be the same computing device 142 reference in the environment 100 in FIG. 1. The computing device 201 includes an arrangement of computer hardware and software components that may be used to execute the load generator application 104, the DNS proxy 106, and/or the container 108 with the test application 116. The general architecture of FIG. 2 can be used to implement other devices or services described herein, such as the control plane 112, the deployment service 140, and/or the testing site service 118 referenced in FIG. 1. The computing device 201 may include more (or fewer) components than those shown in FIG. 2. Further, other computing systems described herein may include similar implementation arrangements of computer hardware and/or software components.

The computing device 201 for implementing the peak event testing system 110 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an optional display 218 and an optional input device 220. The network interface 204 may provide the computing device 201 with connectivity to one or more networks or computing systems. The hardware processor 202 may thus receive information and instructions from other computing systems or services via the network. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the peak event testing system 110. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the peak event testing system 110.

The memory 210 may include a load generator application 104, the DNS proxy 106, and/or the container 108 with the test application 116 that may be executed by the hardware processor 202. In some embodiments, the load generator application 104, the DNS proxy 106, and/or the container 108 with the test application 116 may implement various aspects of the present disclosure. In some embodiments, the load generator application 104 can instantiate the DNS proxy 106 and/or the container 108 with the test application 116; the test application 116 can create DNS queries to be sent; the DNS proxy 106 can intercept, modify, and send the modified DNS queries; and/or the test application 116 can send the content request to the IP address specified by the DNS reply to the modified DNS query.

Figure 3:
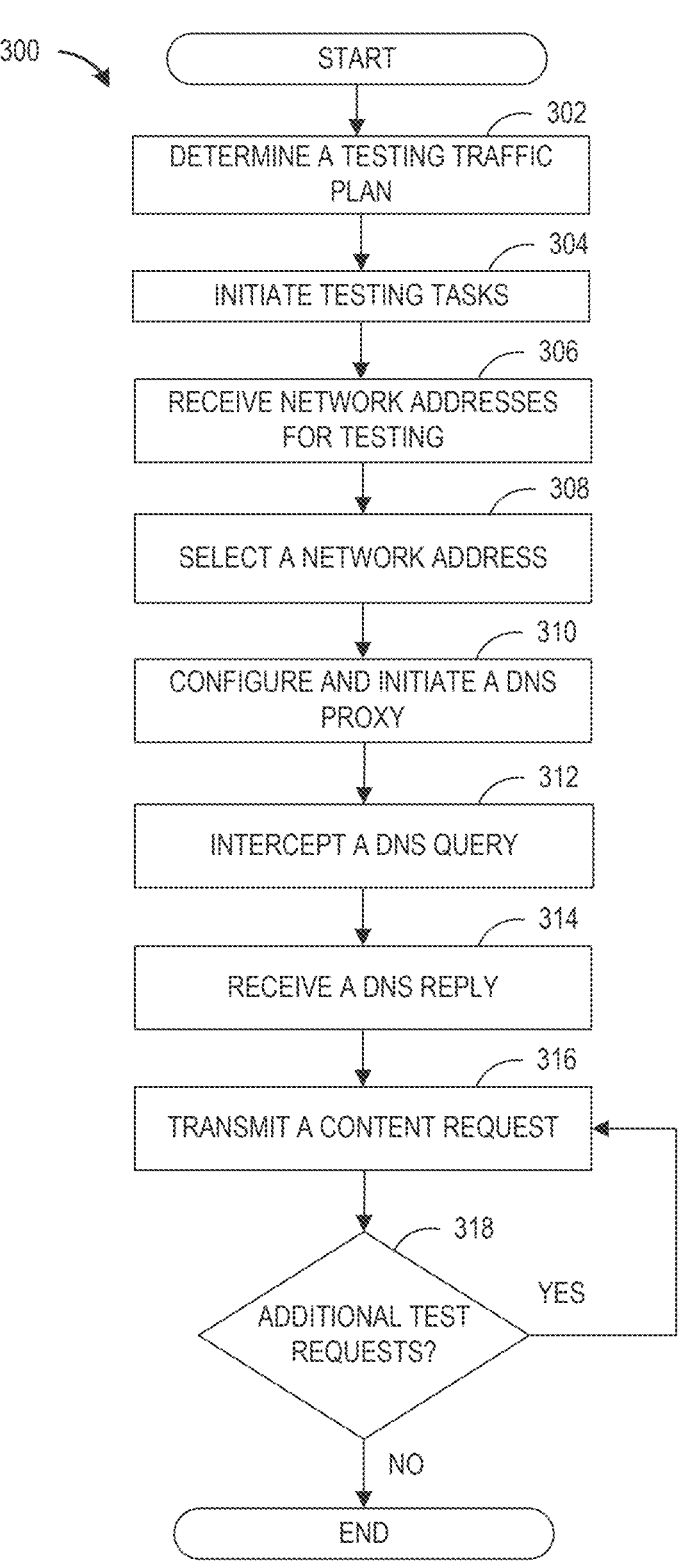
FIG. 3 is a flow chart depicting a method for implemented by the peak event testing system for performing peak event tests.

FIG. 3 is a flow chart depicting a method 300 for implemented by the peak event testing system 110 for performing peak event tests. As described herein, the method 300 can enable improved peak event testing where test requests can be dispersed among a sufficient number of PoPs unlike some existing testing systems. In some cases, the network traffic requests can be dispersed among hundreds or thousands of different PoPs instead of single digit numbers of PoPs based on the location of the data centers under prior approaches. Moreover, the method 300 can allow improved testing without necessarily requiring any changes at the CDN 130.

Beginning at block 302, a testing traffic plan can be determined. In some embodiments, the deployment service 140 can access the data storage 114, which can include testing parameters. The testing parameters can indicate how much traffic (such as content requests) each data center 140 should be configured to generate. In some embodiments, there can be logical divisions, such as a traffic profile per data center 140, that indicates how much traffic the logical division should be configured to generate. For example, a testing traffic plan can specify an amount of traffic for a period of time to simulate a peak event (such as billions of HTTP requests per hour or millions of requests per minute).

At block 304, testing tasks can be initiated. The testing tasks can set up the testing environment(s), which can be distributed across multiple data centers 140. In some embodiments, the deployment service 140 can lease computing devices 142 from the data centers 140. The deployment service 140 can deploy a load generator application 104 to computing devices 142 in data centers 140. The deployment service 140 can deploy containers 108 to computing devices 142 in data centers 140. The deployment service 140 can deploy multiple containers 108 to the same computing device 142. As described herein, the deployed containers 108 can each include a test application 116. The testing tasks can include initiating the load generator application 104 or configuring the load generator application 104 to execute upon startup of the computing devices 142. In some embodiments, the load generator application 104 can include or be implemented with one or more scripts.

At block 306, network addresses can be received for testing. The load generator application 104 can receive, from the testing site service 118, at least a portion of a network address different from at least a portion of a network address associated with the computing device 142. As described herein, the load generator application 104 can receive one or more IP subnets that are different from the IP subnet of the computing device 142. In some embodiments, the network addresses (such as IP subnets) can each be associated with a host from a computing service (such as cloud computing service provided by an organization) with sufficient variety as compared to the IP subnets of the data centers 140. In other embodiments, the network addresses (such as IP subnets) can each be associated with a client that requested content from the domain.

As described herein, the peak event testing system 110 can use the extension mechanism for DNS (EDNS) to specify spoofed, source IP subnets. EDNS client subnet can be an option in EDNS that allows a recursive DNS resolver to specify the subnetwork for the host or client on whose behalf it is making a DNS query (which can be spoofed). This can normally be intended to help speed up the delivery of data from DNS, by allowing better use of DNS-based load balancing to select a service address near the client when the client computer is not necessarily near the recursive resolver. However, the EDNS client subnet can be used herein to disperse peak event testing network traffic.

At block 308, a network address can be selected. The peak event testing system 110 (such as the testing site service 118 and/or the load generator application 104) can select, from the multiple network address (such as IP subnets), a particular network address (such as a particular IP subnet), where a network address associated with the computing device 142 is different from the selected network address (such as the selected IP subnet). The peak event testing system 110 can pseudo-randomly or randomly select the network address from the multiple network address. Additionally or alternatively, the peak event testing system 110 can use another method to select the network address, such as a round-robin technique.

In some embodiments, the peak event testing system 110 can use a heuristic where random or pseudo-random subnets are selected and are naively changed to the subnet mask/24 (which can be the subnet size supported by EDNS). As described herein, the load generator application 104 can receive multiple IP subnets. The load generator application 104 can select, from the multiple IP subnets, a first IP subnet, where an IP subnet associated with the computing device 142 is different from the first IP subnet. In particular, the load generator application 104 can pseudo-randomly or randomly select the first IP subnet from the multiple IP subnets.

The below pseudocode in Table 1 can be a shell script provided to the computing devices 142 to run on launch whose output is at least a portion of a network address (such as IP subnet) that the load generator application 104 can use as a spoofed source location for the test application's 116 DNS requests. As described herein, by requesting a DNS server for an IP address close to the IP subnet, the peak event testing system 110 can get IP addresses serving the target domain around the world, so that it can more accurately represent actual traffic for that domain and not adversely impact the few CDN PoPs 130 closest to the data centers 140. The pseudocode provided herein (such as in Table 1) does not correspond to any programming or scripting language but is provided as example programming/scripting logic.

TABLE 1

```
1 retrieve network addresses from
   https://ip-ranges.testingsiteservice.com/ip-ranges.json
2 for the network addresses discard the prefix
   length and use /24 instead
3 sort the network addresses and remove any duplicates
4 randomly/pseudo-randomly pick a network address
   from the sorted list
```

In some embodiments, the test network address can be gathered from actual CDN 130 traffic logs. As described herein, the network addresses (such as IP subnets) can each be associated with a client that requested content from the domain. The peak event testing system 110 can determine the client IP subnets from actual requests and recreate ratios of requests from those subnets during testing. The peak event testing system 110 (such as the testing site service 118) can determine statistical data indicating an amount of requests for the domain being tested for each network address (such as IP subnet). The peak event testing system 110 (such as the testing site service 118) can select, from the multiple network addresses (such as IP subnet), a particular network address (such as IP subnet) based at least in part on the statistical data. In some embodiments, the testing site service 118 can allocate the test network addresses to the test computing devices 142 according to the statistical data (such as ratios).

At block 310, a DNS proxy 106 can be configured and/or initiated. In some embodiments, the load generator application 104 can configure and/or initiate a DNS proxy 106 on the computing device 142. The load generator application 104 can prepare, at the computing device 142, a configured DNS proxy 106 (i) with at least the portion of the determined network address as a source address and (ii) to intercept DNS queries originating from the container 108. The DNS proxy 106 can be a lightweight DNS proxy server, which can be configured to intercept, modify, and forward DNS requests to a selected DNS resolver 121. The load generator application 104 can specify, via configuration, one or more DNS resolvers 121 that are configured to process a source network address parameter provided in a DNS query (such as a DNS resolver 121 configured to support EDNS client subnets). The load generator application 104 can initiate, at the computing device 142, the configured DNS proxy 106.

The load generator application 104 can set up a DNS proxy server that is able to spoof a source network address (such as subnet) and forward DNS requests to the DNS resolver 121 (such as a DNS recursive resolver) that is configured to receive the source network address parameter. As described herein, the testing site service 118 and/or the load generator application 104 can select a network address to spoof and the load generator application 104 can configure the DNS proxy 106 to use it. The load generator application 104 can have logic to update networking configuration on the computing device 142 such that the one or more containers 108 on the computing device 142 direct DNS queries to the DNS proxy 106. In some embodiments, this can be done by the load generator application 104 by specifying the IP address of the computing device 142 as the first entry in a list of DNS nameservers in a networking configuration file on the computing device 142. So long as the DNS proxy 106 is running on the computing device 142, the DNS queries from the containers 108 can be automatically directed to the DNS proxy 106 and spoofed, as described herein. The below pseudocode in Table 2 can initiate and configure the DNS proxy 106.

9

TABLE 2

1 install a DNS proxy server
2 set a default DNS resolver configuration for the DNS proxy server
3 add the source network address configuration for the DNS proxy server
4 start the DNS proxy server In some embodiments, there can be a single DNS proxy 106 for the computing device 142. In those embodiments, the DNS traffic leaving multiple containers from the same computing device 142 can share the same spoofed network source address. In other embodiments, there can be a DNS proxy 106 configured for each container 108 such that each container can have a separate, potentially different spoofed network address. An advantage of using a DNS proxy configured for the containers 108 on the computing device 142 is that the testing performed at the containers 108, which can include DNS spoofing, can be separate from other services outside of the containers 108 on the computing device 142. Thus, in a virtualized environment, the DNS proxy 106 can spoof the DNS queries used for testing from the computing device 142 while leaving other network traffic unrelated to testing and originating from the computing device 142 unchanged.

At block 312, a DNS query can be intercepted. A test application 116 in the container 108 can be initiated. As described herein, the test application 116 can include or be a headless browser application. As part of peak event testing, the test application 116 can resolve an IP address for the domain to be tested and in the process create a DNS query for the domain name. The DNS proxy 106 can intercept the DNS query and create a modified DNS query from the DNS query with at least the portion of the determined network address as the source address. As described herein, where the determined network address is an IP subnet, the DNS proxy 106 can set the determined IP subnet as the source subnet via EDNS. In other embodiments, the DNS proxy 106 could be configured to modify the DNS query in other ways. For example, if the network address is an IP address, the DNS proxy 106 could encrypt the IP address into the domain name and pass the IP address to the DNS resolver 121 via encrypted data. The DNS proxy 106 can transmit the modified DNS query to the DNS resolver 121.

At block 314, a DNS reply can be received. The test application 116 (which can be via the DNS proxy 106) can receive, from the DNS resolver 121, a DNS reply based at least in part on at least the portion of the determined network address as the source address. The DNS reply can include an IP address for a particular PoP 132 among multiple PoPs of the CDN 130.

At block 316, a content request can be transmitted. The test application 116 can transmit, via the test application 116, a content request with the IP address as a destination address for the particular PoP 132 of the CDN 130. As described herein, instead of the test application 116 and many other instances of the test application running at the data center 140 requesting content from the same POP localized to the data center 140, the test application 116 can instead request content from the particular PoP 132 among a larger set of PoPs (which do not have to be localized to the data center 140) that are used by the set test application instances running on the data center 140. For example, another computing device located at the same data center 140 that is also running tests can be assigned a different client subnet for EDNS (where the first and second computing devices would normally have the same subnet) and the computing devices can be directed to different PoPs 132 even though the computing devices may be located at the same data center 140.

At block 318, it can be determined whether there should be additional test requests. The test application 116 can determine the amount of requests to be sent to the CDN 130. For example, the test application 116 can check a traffic profile established by the control plane 112. The traffic profile can indicate a quantity of requests, a time period of requests, and/or a bandwidth of requests that should be sent by the test applications 116. If a threshold has not been satisfied, then the method can return to the block 316 to transmit additional requests. In some embodiments, the method 300 can return to block 312 to intercept additional DNS queries, if a DNS result has not been cached and/or the cached DNS reply becomes stale. The test application 116 can keep sending content requests until a threshold has been satisfied (such as a threshold quantity of requests has been exceeded, a time period has elapsed, and/or a bandwidth has been exceeded).

The Pops 132 and the CDN 130 can provide content to the test application 116. As described herein, the peak event testing system 110 can test for a peak event. The peak event can be a period of time when the organization expects higher than normal amounts of network traffic requesting content from the CDN 130. In the case of a domain being an e-commerce site, the peak event can be a shopping related holiday or deal savings event that causes a large amount of network traffic for the CDN 130. The peak event testing can ensure that an organization's backend is sufficiently prepared for the large amounts of network traffic that a peak event can bring.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for peak event testing, the system comprising:
a non-transitory data storage medium; and
a computer hardware processor in communication with the non-transitory data storage medium, wherein the computer hardware processor is configured to execute computer-executable instructions to at least:
deploy, at a computing device, a container comprising a test application;
receive, from a testing site service, a plurality of Internet Protocol (IP) subnets;
select, from the plurality of IP subnets, a first IP subnet, wherein an IP subnet associated with the computing device is different from the first IP subnet;
prepare, at the computing device, a configured Domain Name System (DNS) proxy (i) with the first IP subnet as a source subnet and (ii) to intercept DNS queries originating from the container;
initiate, at the computing device, the configured DNS proxy;
create, via the test application, a DNS query for a domain to be tested;
create, via the configured DNS proxy, a modified DNS query with the first IP subnet as the source subnet from the DNS query;
transmit, via the configured DNS proxy, the modified DNS query to a DNS resolver;
receive, from the DNS resolver, a DNS reply based at least in part on the first IP subnet as the source subnet, the DNS reply comprising a first IP address for a point of presence (POP) from a plurality of PoPs; and
transmit, via the test application, a content request with the first IP address as a destination address.

2. The system of claim 1, wherein to select the first IP subnet, the computer hardware processor is configured to execute further computer-executable instructions to at least:
pseudo-randomly or randomly select the first IP subnet from the plurality of IP subnets.

3. The system of claim 1, wherein to create the modified DNS query with the first IP subnet as the source subnet, the computer hardware processor is configured to execute further computer-executable instructions to at least:
set the first IP subnet as the source subnet via an extension mechanism for DNS.

4. The system of claim 1, wherein the computer hardware processor is configured to execute further computer-executable instructions to at least:
determine statistical data indicating an amount of requests for the domain for each IP subnet from the plurality of IP subnets, wherein to select, from the plurality of IP subnets, the first IP subnet, the computer hardware processor is configured to execute the further computer-executable instructions to at least:

select, from the plurality of IP subnets, the first IP subnet based at least in part on the statistical data.

5. The system of claim 1, wherein each IP subnet from the plurality of IP subnets is associated with a host from a computing service.

6. The system of claim 1, wherein the test application comprises a headless browser application and the headless browser application causes creating the DNS query.

7. A computer-implemented method comprising:

under control of a computer hardware processor configured with specific computer-executable instructions, deploying, at a computing device, a container comprising a test application;

receiving, from a testing site service, at least a portion of a first network address different from at least a portion of a network address associated with the computing device;

preparing, at the computing device, a configured Domain Name System (DNS) proxy (i) with at least the portion of the first network address as a source address and (ii) to intercept DNS queries originating from the container;

initiating, at the computing device, the configured DNS proxy;

creating, via the test application, a DNS query for a domain to be tested;

creating, via the configured DNS proxy, a modified DNS query with at least the portion of the first network address as the source address from the DNS query;

transmitting, via the configured DNS proxy, the modified DNS query to a DNS resolver;

receiving, from the DNS resolver, a DNS reply based at least in part on at least the portion of the first network address as the source address, the DNS reply comprising a first Internet Protocol (IP) address for a point of presence (POP) from a plurality of PoPs; and transmitting, via the test application, a content request with the first IP address as a destination address.

8. The computer-implemented method of claim 7, wherein at least the portion of the first network address is a first IP subnet.

9. The computer-implemented method of claim 8, further comprising:

determining a plurality of IP subnets, wherein each IP subnet from the plurality of IP subnets is associated with a client that requested content from the domain, wherein the plurality of IP subnets comprises the first IP subnet.

10. The computer-implemented method of claim 9, further comprising:

determining statistical data indicating an amount of requests for the domain for the each IP subnet from the plurality of IP subnets; and selecting, from the plurality of IP subnets, the first IP subnet based at least in part on the statistical data.

11. The computer-implemented method of claim 8, further comprising:

determining a plurality of IP subnets, wherein each IP subnet from the plurality of IP subnets is associated with a host from a computing service; and select the first IP subnet from the plurality of IP subnets.

12. The computer-implemented method of claim 8, wherein the source address is a source subnet and creating the modified DNS query further comprises:

setting the first IP subnet as the source subnet via an extension mechanism for DNS.

13. The computer-implemented method of claim 7, wherein the test application comprises a headless browser application and the headless browser application causes creating the DNS query.

14. A system comprising:

a non-transitory data storage medium; and a computer hardware processor in communication with the non-transitory data storage medium, wherein the computer hardware processor is configured to execute computer-executable instructions to at least:

deploy, at a computing device, a container comprising a test application;

receive, from a testing site service, at least a portion of a first network address different from at least a portion of a network address associated with the computing device;

prepare, at the computing device, a configured Domain Name System (DNS) proxy (i) with at least the portion of the first network address as a source address and (ii) to intercept DNS queries originating from the container;

initiate, at the computing device, the configured DNS proxy;

create, via the test application, a DNS query for a domain to be tested;

create, via the configured DNS proxy, a modified DNS query with at least the portion of the first network address as the source address from the DNS query;

transmit, via the configured DNS proxy, the modified DNS query to a DNS resolver;

receive, from the DNS resolver, a DNS reply based at least in part on at least the portion of the first network address as the source address, the DNS reply comprising a first Internet Protocol (IP) address for a point of presence (POP) from a plurality of PoPs; and transmit, via the test application, a content request with the first IP address as a destination address.

15. The system of claim 14, wherein at least the portion of the first network address is a first IP subnet or a second IP address.

16. The system of claim 15, wherein the computer hardware processor is configured to execute further computer-executable instructions to at least:

determine a plurality of IP subnets or plurality of IP addresses that requested content from the domain, wherein the plurality of IP subnets comprises the first IP subnet or the plurality of IP addresses comprises the second IP address.

17. The system of claim 14, wherein at least the portion of the first network address is a first IP subnet, wherein the computer hardware processor is configured to execute further computer-executable instructions to at least:

determine a plurality of IP subnets, wherein each IP subnet from the plurality of IP subnets is associated with a client that requested content from the domain, wherein the plurality of IP subnets comprises the first IP subnet.

18. The system of claim 17, wherein the computer hardware processor is configured to execute additional computer-executable instructions to at least:

determine statistical data indicating an amount of requests for the domain for the each IP subnet from the plurality of IP subnets; and select, from the plurality of IP subnets, the first IP subnet based at least in part on the statistical data.

19. The system of claim 14, wherein at least the portion of the first network address is a first IP subnet, wherein the computer hardware processor is configured to execute further computer-executable instructions to at least:

determine a plurality of IP subnets, wherein each IP subnet from the plurality of IP subnets is associated with a host from a computing service; and select the first IP subnet from the plurality of IP subnets.

20. The system of claim 19, wherein to select the first IP subnet from the plurality of IP subnets, the computer hardware processor is configured to execute additional computer-executable instructions to at least:

pseudo-randomly or randomly select the first IP subnet from the plurality of IP subnets.

\* \* \* \* \*